United States Patent [19]

Bloomer

[11] Patent Number: 4,617,508
[45] Date of Patent: Oct. 14, 1986

[54] REVERSE PHASE-CONTROL APPARATUS FOR MULTIPLEXING INTERCONNECTIONS BETWEEN POWER SWITCHING AND CONTROL CIRCUIT MODULES

[75] Inventor: Milton D. Bloomer, Scotia, N.Y.

[73] Assignee: General Electric Company, Schenectady, N.Y.

[21] Appl. No.: 667,926

[22] Filed: Nov. 2, 1984

[51] Int. Cl.$^4$ .................................... G05F 1/445
[52] U.S. Cl. ................................. 323/237; 323/244
[58] Field of Search .............. 323/235, 236, 237, 239, 323/319, 320, 324, 244; 315/194

[56] References Cited

U.S. PATENT DOCUMENTS

| | | | |
|---|---|---|---|
| 4,158,150 | 6/1979 | Dever | 323/319 |
| 4,245,184 | 1/1981 | Billings et al. | 323/235 |
| 4,274,045 | 6/1981 | Goldstein | 323/319 |

FOREIGN PATENT DOCUMENTS 2125994  3/1984  United Kingdom ............... 323/235

Primary Examiner—William H. Beha, Jr.
Attorney, Agent, or Firm—Geoffrey H. Krauss; James C. Davis, Jr.; Marvin Snyder

[57] ABSTRACT

Multiplexing apparatus interconnects at least one power switching device, itself connected to a load for controlling of flow of current through that load from an AC source, with a control circuit for controlling conduction of the switching device(s). The multiplexing apparatus uses a full-wave rectifier for providing both half-cycles of the source AC signal waveform, transformed to have a common preselected polarity, with a first DC level to obtain zero crossing information for determining the start of switching device conduction. The same comparator is utilized with a level switch, now providing a second DC level, and a resistive divider for attenuating the voltage across the conducting switching device by a known factor, for monitoring the switching device saturation voltage during conduction. The apparatus may also include a power supply subcircuit, for providing an operating potential to a completely integrated semiconductor circuit containing this apparatus.

21 Claims, 5 Drawing Figures

REVERSE PHASE-CONTROL APPARATUS FOR MULTIPLEXING INTERCONNECTIONS BETWEEN POWER SWITCHING AND CONTROL CIRCUIT MODULES

BACKGROUND OF THE INVENTION

The present invention relates to control of the electrical energy delivered by a source to a load and, more particularly, to novel multiplexing apparatus for reducing the number of parts and interconnections required between at least one power-controlling switching means, in series with the load and the source, and control circuitry for properly actuating the at least one switching means.

It is known to use phase-control circuitry to control the power consumed, from an AC source, by a load. This form of power-control circuit connects the load across the source for only a portion of each source waveform half-cycle. It is known to control the duration of the load connection time interval responsive to either an external parameter, such as a variable resistance in a lamp dimmer circuit, which external parameter is not influenced by any physical characteristic of the load (an open-loop control circuit), or to feed back information from the load to obtain a self-correcting response (a closed-loop control circuit). It is also known to configure either an open-loop or closed-loop load control circuit with at least one power-switching solid-state device in series with the load, across the source, and to operate the at least one power-switching device in either a forward phase-control condition or a reverse phase-control condition. In the forward-phase-control condition, the power-switching device: is in the non-conductive condition for some time after each line voltage zero crossing at which a particular line voltage waveform half-cycle commences; is controlled to the conducting condition ("turned-on") at a time during that line voltage waveform half-cycle when a non-zero line-line voltage is present; and is removed from conduction ("turnedoff") at the next line-line voltage zero crossing. The termination of conduction can be a self-commutation action (if the power-switching device(s) is an SCR or the like device) or can be a driven turn-off action responsive to a turn-off signal provided by a control circuit external to the device(s) (if each of the at least one power-switching device is a controllable-turn-off device, such as an insulated gate transistor (IGT), a bipolar junction transistor, a power MOSFET and the like). In the reverse-phase-control condition, the at least one power-switching device (as more fully described and claimed in my co-pending U.S patent application Ser. No. 529,296, filed Sept. 6, 1983, now U.S. Pat. No. 4,528,494, issued July 9, 1985, assigned to the assignee of the present application and incorporated herein in its entirety by reference): is controlled to the conducting condition at each line voltage zero crossing; remains conductive for a time interval thereafter (responsive to an open-loop or closed-loop input); is removed from conduction thereafter while a non-zero voltage is present across the load; and remains non-conductive until the next line voltage zero crossing occurs. It will be understood that only power-switching devices capable of being driven to the turned-off condition can be utilized for in reverse-phase-control circuits.

Either form of load control circuit at least requires: (a) means for determining the occurrence of line voltage zero crossings, which zero-crossing means requires a pair of input signals to determine the positive-going zero crossing and the negative-going zero crossing of the line voltage waveform; (b) means for connecting to at least one of the switching device(s) the turn-on and/or turn-off signal(s); and (c) a circuit common connection. In order to provide greatest reliability and lowest cost to the user, it is desirable to reduce to a minimum both the number of components and the number of interconnections, between the control circuitry and the load/switching device(s) combination. For similar reasons, it is also desirable to provide the control circuitry in an integrated circuit form. However, it will be understood that providing closed-loop control of the load is also desirable, particularly where the load may be prone to accelerated failure if a particular load parameter magnitude is exceeded; feedback control of the load parameter typically requires at least one additional interconnection between the load and/or switching device and the switching device control circuit itself. It is also highly desirable to provide operating power to the control circuit from the line itself, necessitating at least one (and typically a plurality of) additional interconnections. Other required and/or desired features may further increase the number of interconnections between the load/switching device(s) and the switching control circuit: a reduced switching voltage rate-of-change (dV/dt) may be required, e.g. to reduce electromagnetic interference caused by the switching process, to prevent exceeding a switching device limit (responsible for accelerated failure of the switching device) and the like; monitoring of the switching device controlled-conduction-circuit voltage and/or current may be required to assure that the turned-on switching device is in the saturated condition, and thus not dissipating excessive power which may cause an accelerated failure rate; and the like. For example, the controlled switching of non-regenerative power semiconductors may be provided as described and claimed in my co-pending U.S. patent application Ser. No. 499,579, now U.S. Pat. No. 4,540,893, issued Sept. 10, 1985, and the prevention of excess power dissipation in power switching semiconductors may be provided as described and claimed in my co-pending U.S patent application Ser. No. 499,590, now U.S. Pat. No. 4,547,828, issued Oct. 15, 1985, assigned to the assignee of the present application, and incorporated herein in their entireties by reference. When the power-switching semiconductors(s) control circuitry includes any such additional features, the number of interconnections therebetween, and the number of discrete components (resistors, capacitors and the like) required, can be significant. The additional cost, and especially the additional failure rates thereof, may predominately determine the cost and/or reliability of the entire load control apparatus. For example, a closed loop lamp control circuit, having an integrated circuit drive means for a pair of power-switching semiconductors, can require as many as 10 external resistors and 12 interconnections for completing the circuit. It is highly desirable to provide some means for reducing the number of components external to the switching device control (integrated) circuit, and for reducing the number of interconnections between that control (integrated) circuit and the power-switching device(s) and load.

BRIEF SUMMARY OF THE INVENTION

In accordance with the invention, multiplexing apparatus for interconnecting at least one power switching device, connected to a load for controlling a flow of current through that load from an AC source, with control circuit means for controlling conduction of said at least one switching device, includes: means for comparing first and second signals to provide one of first and second output conditions responsive to said first signal being respectively less than and greater than said second signal; full-wave rectifier means for providing both half-cycles of the source AC signal waveform with a common, preselected polarity, as said first signal; switch means for providing said second signal at one of first and second reference levels responsive to the state of a first control circuit means output; and means for attenuating the first signal by a known factor, responsive to the state of another control circuit means output. Thus, the multiplexing apparatus operates in conjunction with at least one resistance element, each connected to an associated one of the switching device(s), to monitor a plurality of different circuit parameters, without requiring a large number of interconnections and external elements. The multiplexing apparatus may also include power supply means for providing an operating potential to at least one of the control circuit, comparing, rectifier, switch and attenuating means.

In a presently preferred embodiment, the rectifier means uses a first comparator and a pair of switch means. Each of the plurality of switch means is realized with at least one controlled-conduction device, to facilitate complete integration of the multiplexing apparatus with the control circuit means in an integrated semiconductor circuit.

Accordingly, it is an object of the present invention to provide novel multiplexing circuitry for reducing the number of interconnections and elements, between at least one power-switching device and switching device control means, in a phase-control circuit for controlling at least one parameter of the energy supplied to a load resistance from an AC source.

This and other objects of the present invention will become apparent upon reading of the following detailed description, when considered in conjunction with the drawings.

DETAILED DESCRIPTION OF THE INVENTION

Figure 1:
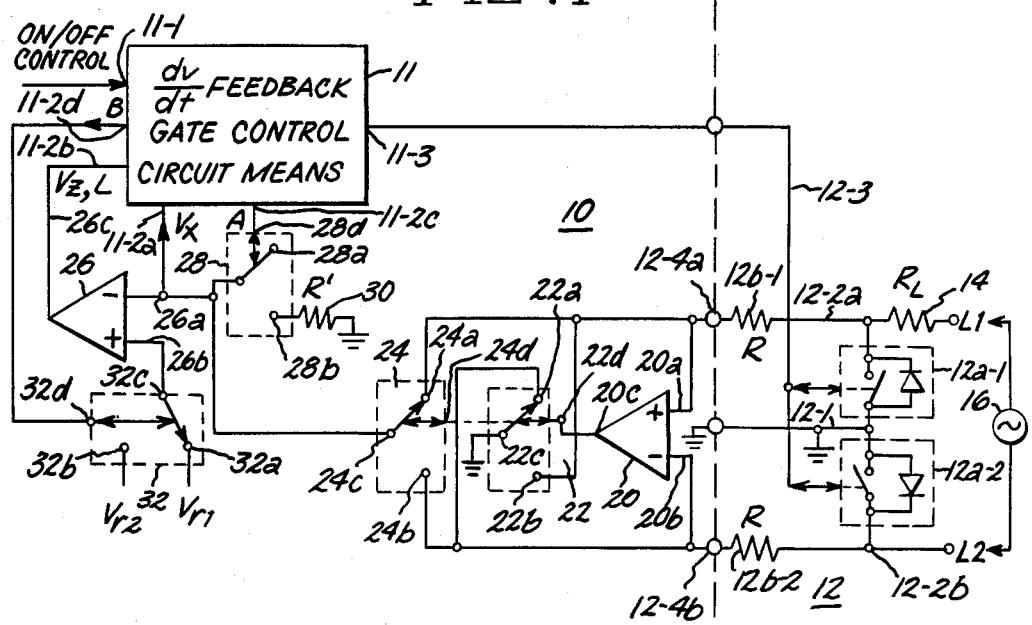
FIG. 1 is a schematic diagram of a phase-control circuit utilizing: a pair of power-switching semiconductors connected in series with the load, across an AC source; a controlled voltage rate-of-change feedback gate control circuit means for controlling the power-switching semiconductor devices; and a presently-preferred embodiment of the novel multiplexing means of the present invention.
Figure 1A:
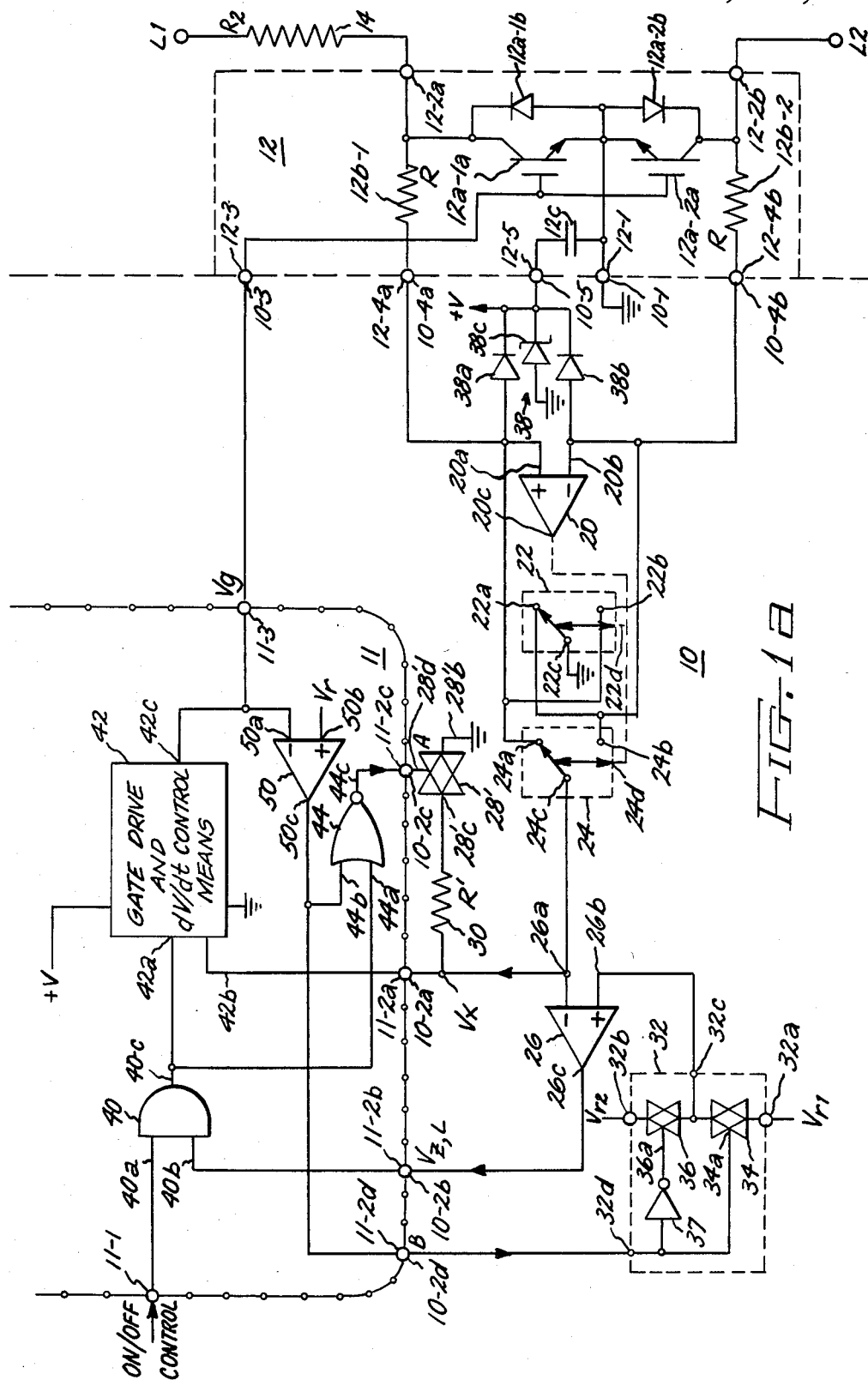
FIG. 1a is a more detailed schematic diagram of the apparatus of FIG. 1, illustrating additional circuitry details, and useful in an appreciation of the manner in which my novel multiplexing means operates.

Referring initially to FIGS. 1 and 1a, a presently preferred embodiment 10 of a multiplexing means, in accordance with the present invention, is connected to a control circuit means 11 for controlling the time intervals of conduction and non-conduction of at least one power switching means 12, connected in series with a load 14, having a load resistance $R_L$, between the first and second line terminals L1 and L2 of an AC source means 16. Illustratively, power-switching means 12 comprises a pair of power-switching devices 12a-1 and 12a-2, with each switching device having its controlled-conduction-circuit paralleled by a reverse-conduction element, such as a diode and the like; the series-connected power switching devices 12a have the common junction therebetween connected to a circuit common potential connection 12-1. The power switching devices act to substantially connect/disconnect the switching circuit node 12-2a to/from switching circuit node 12-2b, responsive to the state of the signal at a switching control input 12-3. The control circuit means 11 receives an on/off control signal (from a load parameter setting-/monitoring means (not shown) included in the same integrated circuit having means 10 and 11 therein) at a first input terminal 11-1, and also responsive to various multiplexing means 10 inputs and outputs at terminals 11-2; provides the switching device control signal at an output terminal 11-3. The non-shown load setting circuit portion can be of open-loop or closed-loop type and will typically require that an input be provided at a separate terminal to the integrated multiplex/control circuit.

The power switching devices are advantageously packaged in a module 12 which also includes a pair of switching device voltage sampling resistance elements 12b-1 and 12b-2, each having a resistance R and each connected between one of nodes 12-2a or 12-2b and an associated one of module outputs 12-4a or 12-4b. The switching device module 12 advantageously also contains a power supply filter capacitor 12c connected between common potential terminal 12-1 and a terminal 12-5 (FIG. 1a) at which the control circuit positive operating potential $+V$ is provided. Illustratively, switching means 12a-1 and 12a-2 each comprise an insulated-gate transistor 12a-1a or 12a-2a, each having: its gate terminal connected in parallel with the gate terminal of the other device and to module control input 12-3; its emitter electrode connected in parallel to circuit common potential terminal 12-1; and its collector electrode connected to one of switching module nodes 12-2a or 12-2b. An associated reverse-conduction diode 12a-1b or 12a-2b is formed across the controlled-conduction anode-cathode circuit of each switching device, e.g. across the emitter-collector circuit of each IGT. It will thus be seen that four interconnections are required between the control circuit (the combination of means 10 and 11) and the switching module 12, and two external resistors (elements 12b-1 and 12b-2) are required for the basic phase-control circuit; an additional interconnection and one additional external element (capacitance 12) are required if the control circuit operating potential is also provided from the load-energizing source means 16. Another interconnection may also be required to provide a closed-loop on-off signal to control means input 11-1.

Multiplexing means 10, for providing a plurality of signals (required by control means 11) from information available at the terminals 12-4a and 12-4b of substantially-resistive elements, includes a first comparator means 20, having a non-inverting, + input 20a connected to a multiplexing means first input terminal 10-4a, itself connected to power module first sampling output terminal 12-4a, and an inverting, —input 12b connected to a multiplexing means second input terminal 10-4b, itself connected to power module second sampling output terminal 12-4b. First and second switch means 22 and 24 are each of single-pole, double-throw type, having first selectable contact terminals 22a or 24a respectively connected to multiplexing means sample input terminals 10-4b or 10-4a, respectively. The second selectable terminals 22b or 24b of these first two switch means are respectively cross-connected to multiplexing means sample input terminal 10-4a or 10-4b, respectively. The common terminal 22c of first switch means 22 is connected to circuit common potential, while the common terminal 24b of the second switch means 24 is connected to a first input 26a of a second comparator means 26. The switch-position-control inputs 22d and 24d of the first and second switch means 22 and 24 are connected together in parallel to the output 20c of first comparator means 20; first and second switch means 22 and 24 are thus effectively configured as a double-pole, double-throw switch means for alternatingly connecting each of multiplexing means sample input terminals 10-4a or 10-4b either to second comparator input 26a or to common potential, responsive to the logic level at the first comparator means output 20c. Another switching means 28 has a first selectable terminal 28a connected to an essentially open circuit, a second selectable terminal 28b connected through another resistance element 30, of resistance magnitude R', to circuit common potential, and a common contact 28c connected to second comparator inverting input 26a. The common terminal 28c is controlled between open-circuit terminal 28a and shunt resistance terminal 28b responsive to the logic A signal at a switch means control input 28d. As switch means 28 is controlled between an essentially open-circuit condition and an essentially short-circuit condition (connecting terminals 28b and 28c), I have advantageously utilized a controlled-conduction device 28' having a controlled-conduction circuit between terminals 28'd (connected to circuit common potential) and terminal 28'c (connected to series resistor 30 and thence to comparator input 26a) and having a control input 23'd at which the logic A signal is applied.

The non-inverting, + input 26b of second comparator 26 receives a selected one of a pair of reference voltages $V_{r1}$ and $V_{r2}$. Reference voltage $V_{r1}$ (provided by means not shown but well known to the art) is a first positive-polarity voltage, provided at a first selectable terminal 32a of switch means 32. The first reference voltage $V_{r1}$ substantially sets the line-line potential at which the switching device(s) 12a begin to conduct, and is advantageously of small magnitude, e.g. typically between zero volts and the minimum expected forward-conduction voltage drop of devices 12a. The second reference voltage $V_{r2}$ is another positive-polarity voltage, provided at a magnitude greater than the magnitude of first reference voltage $V_{r1}$, at second switch means selectable terminal 32b. The second reference voltage substantially sets the desired level of power-switching device "saturation" voltage, for determination of whether the conducting switching device is in the desired voltage saturation mode or in the undesired active-linear mode; a typical $V_{r2}$ magnitude is about 3 volts for IGT switching devices 12a-1a and 12a-2a. The selected one of the two reference voltage is provided at the switch means common terminal 32c, responsive to the state of a reference-voltage-switch logic B signal, provided to switch means control input 32d. While any form of single-pole, double-throw switching element can be utilized for switch means 22, 24 and/or 32, it is preferable that a fully-solidstate switching means be utilized for each of means 22, 24 and 32; one possible switch means implementation, capable of full integration in an integrated semiconductor circuit, is illustrated in FIG. 1a. The single-pole, double-throw switch means comprises first and second controlled-conduction elements 34 and 36, each having one terminal of the controlled-conduction-circuit thereof connected together to the switch means common terminal 32c, and having the remaining controlled-conduction-circuit terminal connected to one of switch means first selectable terminal 32a (device 34) or second selectable terminal 32b (device 36). The conduction control input 34a (of that device 34 connected between common terminal 32c and first selectable terminal 32a) is directly connected to the switch means control input 32d, while the remaining controlled-conduction device control input 36a is connected to the output of a logic inverter means 37, having its input connected to switch means control input 32d. It will be seen that responsive to a first logic level, e.g. a high logic level; at control input 32d, one of controlled-conduction devices 34 or 36, e.g. device 34, receives an enabling signal level at its control input, e.g. a high logic level at input 34a, and will conduct to connect one of the selectable terminals, e.g. first selectable terminal 32a, to the common terminal 32c; the other device, e.g. device 36, receives a low logic level (by action of inverter 37) at its control input, e.g. input 36a, and is in the non-conductive condition, substantially isolating the other selectable terminal, e.g. second selectable terminal 32b, from the common terminal 32c. Conversely, responsive to a low logic level at control input 32d, the device, e.g. device 36, formerly in the non-conductive state is switched to the conductive state, connecting second selectable input 32b to common terminal 32c, while the other device, e.g. device 34, is now disabled and substantially isolates first selectable terminal 32a from common terminal 32c. The same switch means, comprised of an inverter and a pair of controlled-conduction devices, can be utilized for each of switch means 22 and 24.

The gate control circuit means 11 (enclosed by a chain line) is preferably also part of the same integrated circuit containing the multiplexing means 10. To provide the positive operating potential +V (required by all of comparators 20 and 26, inverter means 37, and gate control means 11), multiplexing means 10 also comprises means 38 for providing, in conjunction with the external filter capacitor 12c, a DC voltage of desired polarity (e.g. positive-polarity) from the AC line-line voltage. Means 38 advantageously comprises a pair of unidirectionally-conducting devices, such as diodes 38a and 38b, each having an anode connected to one of terminals 10-4a or 10-4b, respectively, and having the cathodes thereof tied together to filter capacitor terminal 10-5 of the integrated circuit, at which terminal the positive operating voltage +V is supplied. It should be understood that means, such as a zener diode 38c or other circuitry well known to the art, can be utilized for regulating operating potential +V, if required.

Control circuit means 11 includes a two-input AND gate 40, having a first input 40a connected to the on/off control terminal 11-1 of the control circuit means (for connection to the output of an open-loop or a closed-loop control means, not shown, for toggling input 11-1 between a low logic "off" level, e.g. about 0 volts, and a high logic "on" level, e.g. about +V volts). The second gate input 40b is connected to another control circuit means input 11-2b, itself connected to the second comparator output 10-2b of the multiplexing means, at which the voltage $V_{Z,L}$ appears. The gate output 40c is connected to a first, or turn-on/turn-off control input 42c of a gate drive and dV/dt control means 42 which may be as disclosed in the above-designated U.S. Pat. No. 4,540,893. This means has a second, or dV/dt feedback information, input 42b, connected to input 11-2a to receive the $V_x$ signal at the multiplexing means output 10-2a. Means output 42c is connected to control circuit means output 11-3 to supply the IGT gate voltage $V_g$ to integrated circuit terminal 10-3 and thence to the control input terminal 12-3 of the switching device module 12, responsive to the signals at inputs 42a and 42b. Output 42c is also connected to an inverting,—input 50a of a third comparator means 50, which also has a non-inverting, + input 50b receiving a substantially-constant reference voltage $V_r$ (substantially equal to the conduction threshold voltage $V_{th}$ above which one of IGTs 12a-1a and 12a-2a will be in the conductive condition). The third comparator output 50c is connected to the remaining input 44b of the NOR gate, and also provides the logic B signal at control circuit means output 11-2d, for introduction to multiplexing means input 10-2d and thence to the control input 32d of switch means 32. The NOR gate output 44c provides the logic A signal to control circuit means output 11-2c, for coupling to multiplexing means input 10-2c and thence to the control electrode 28'd of controlled-conduction means 28'.

Figure 2:
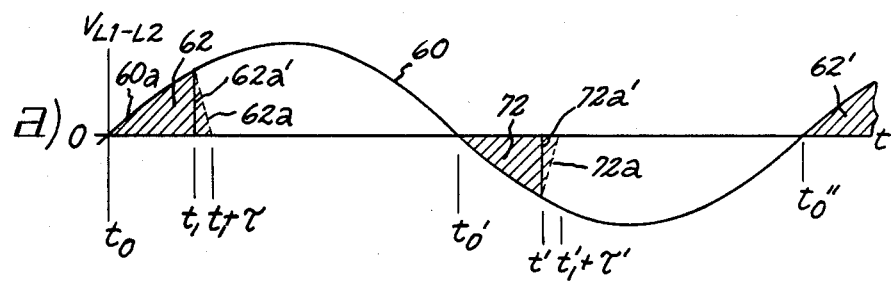
FIGS. 2a-c are a set of three time-related signal waveforms occurring in the circuitry of FIGS. 1 and 1a, and useful in understanding principles of the present invention.
Figure 2:
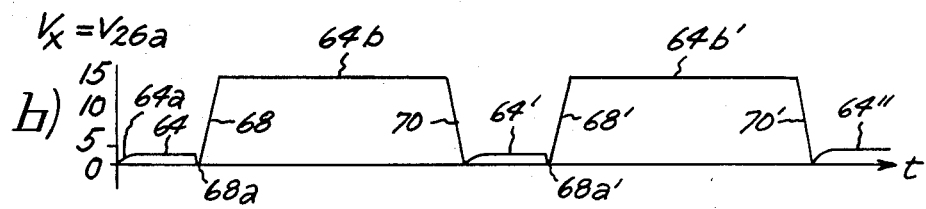
Figure 2:
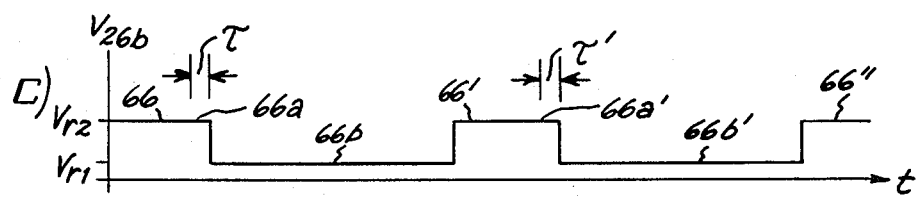

Referring now to all of FIGS. 1, 1a, and 2, the presently preferred multiplexing means 10 operates, in conjunction with control circuit means 11 and switching device module 12, in the following manner: prior to the initial time $t_O$, enough line voltage cycles have occurred to cause rectifiers 38 to conduct to charge filter capacitor 12c to a maximum voltage +V set by the zener voltage of regulator diode 38c, e.g. about +15 volts, to provide operating potential +V. At time $t_O$, the switching devices 12a, e.g. IGTs 12a-1a and 12a-2a, are in the "off" condition. The first comparator output 20c switches to a high logic level, as the potential at the inverting input 20b thereof is no longer more positive than the potential at the non-inverting input 20a. Responsive to the high logic level at output 20c and control inputs 22d and 24d, switch means 22 and 24 are both operated to connect the respective common terminals 22c and 24c to the respective first selectable terminals 22a and 24a (as shown). The line L2 terminal potential appears across resistance 12b-2, as terminals 10-4b and 12-4b are now coupled to common potential by action of switch means 22; this voltage is limited to the conduction voltage drop across now-conducting diode 12a-2b. The increasing, positive-going potential at the line L1 terminal, with respect to circuit common and line L2 potentials, appears as the $V_x$ voltage at multiplexing means output 10-2a. At, and for some time shortly after, zero-crossing time $t_O$, voltage $V_x$ is less than the voltage at second comparator input 26b, as the latter voltage is substantially equal to one of reference voltages $V_{r1}$ or $V_{r2}$, both of which reference voltages are of positive polarity. The second comparator output 26c voltage therefore switches from a low logic level to a high logic level at zero-crossing time $t_O$; if the on/off control input 11-1 is at a high logic level, indicative of the load being commanded to the "on" condition, both AND gate inputs 40a and 40b are at a high logic level, such that the gate output 40c is also at a high logic level, at each line-line potential zero-crossing time $t_O$, $T_O'$, $t_O''$, . . . etc. Responsive to the high logic level at gate output 40c and input 42a, and to the low level at input 42b, output 42c is switched to a relatively high potential level (approximately equal to the operating potential +V supplied thereto). Accordingly, the switching module control voltage $V_g$ is at a positive high logic level, switching into conduction that one of the power module devices 12a-1a or 12a-2a having a positive anode (collector/drain) voltage thereon, i.e. device 12a-1a . The high logic level at output 42c appears at third comparator input 50a and is greater than the reference voltage $V_r$ (set substantially equal to the switching device conduction threshold voltage $V_{th}$) at third comparator second input 50b, causing the third comparator output 50c to be at a low logic level; this low logic level appears as the logic B voltage applied to third switch means control input 32d, causing controlled-conduction device 36 to conduct and apply the second reference voltage $V_{r2}$ to the second comparator non-inverting input 26b (while the other controlled-conduction device 34 receives a low logic level at its control electrode 34a and is in the substantially non-conductive condition). The third comparator output 50c low logic level is also provided to the second input 44b of NOR gate 44, which also receives the high logic level from the AND gate output 40c at its other input 44a; responsive thereto, the NOR gate output 44c provides a low logic level for the logic A signal at the control input 28'd of controlled-conduction device 28'. Controlled-conduction device 28' is therefore in the non-conductive condition, and resistance element 30 is not connected between input 26a and circuit common potential. Thus, during the initial positive-polarity portion 60a of the AC line-line voltage sinusoid waveform 60, immediately after the positive-going zero-crossing time $t_O$, load 14 is effectively connected across source 16, and load current flows, as indicated by shaded portion 62 of FIG. 2a. Simultaneously, the voltage $V_x$ at the output of the precision full-wave rectifier (formed by comparator 20 and switch means 22 and 24) begins to increase in the positive-polarity direction as an initial portion 64a of a sinusoid (FIG. 2b). Further, since the logic B signal is at the low logic level, switch means 32 operates to provide the second comparator input 26b with the higher magnitude reference voltage $V_{r2}$ from switch means 32, as shown by portion 66 of the waveform of FIG. 2c. As long as the voltage, at that one of nodes 12-2a or 12-2b associated with the conducting one of devices 12a-1a or 12a-2a, is not greater than the maximum "saturation" voltage set by $V_{r2}$, as shown during waveform portion 64 in FIG. 2b, the gate signal $V_g$ remains at a high logic level and continues to keep the conducting switching device 12a in the conductive condition, if the voltage at input 11-1 remains in the high logic level "on" condition. If the anode voltage of the conducting IGT exceeds the voltage set by the second reference voltage $V_{r2}$ while the "on" control level is present at input 11-1, the output 26c of second comparator 26 switches to the high logic level, to provide a low logic level at gate output 40c and input 42a and cause commencement of a controlled-turn-off sequence, thus protecting the switching device. Even if the conducting IGT anode voltage does not exceed the second reference voltage $V_{r2}$, then when input 11-1 falls to the low logic level "off" control condition at some time $t_1$, gate output 40c provides a low logic level at input 42a which causes commencement of the controlled-turn-off sequence.

Responsive to either the end of the normal conduction period, at time $t_1$, at which the gate input 40a is switched to the logic zero level, or to a switching device anode voltage being greater than the voltage set by second reference voltage $V_{r2}$ and causing a logic zero level at gate input 40b, the AND gate output 40c falls to a logic zero level. Means 42 now provides a controlled-turn-off reduction of the gate drive signal at output 42c. At the start of this controlled-turn-off action, both inputs of NOR gate 44 are at the logic zero level, providing a high logic level at the gate output 44c. Responsive to the logic A signal being at a high logic level, controlled-conduction device 28' conducts and connects to common potential that terminal of resistance element 30 furthest from the $V_x$ signal node; a voltage-divider (comprised of that one of sampling resistors 12b-1 or 12b-2 associated with that one of power switching devices 12a-1a or 12a-2a presently conducting, and resistance element 30) thus acts on the node voltage, to now provide voltage $V_x$. The voltage $V_x$ at input 26a therefore suddenly drops. as in portion 68a, to a magnitude in accordance with the equation: $V_x=(R'/(R+R'))V_A$, where $V_A$ is the anode voltage of the then-conducting switching device. The initial turn-off action is followed by means 42 reducing $V_g$ voltage magnitude responsive to the dV/dt information fed back to input 42b through the sampling resistors 12b-1 and 12b-2, in conjunction with the divider resistance 30, to cause the gradual decrease of output 46c voltage. This results in a controlled turn-off of the conducting one of switching devices 12a. This gradual, controlled turn-off action is as illustrated by broken line portion 62a (FIG. 2a), which falling edge replaces the abrupt turn-off edge 62a' which would occur if controlled turn-off means 42 were not present. Thus, a time interval $\tau$, determined by the maximum dV/dt value previously set for means 42, is required from the initiation of turn-off until the completion thereof, such that, for a normal commanded turn-off commencing at time $t_1$ (responsive to the control voltage at input 11-1 falling to the low logic "off" level), the conducting one of the switching devices is not completely turned off until time $t_1+\tau$. At this time, the switching device gate control voltage $V_g$ is substantially equal to the switching device conduction threshold voltage, which is itself substantially equal to the reference voltage $V_r$ at third comparator input terminal 50b. The same action would occur, at any time prior to time $t_1$, if the anode voltage of the then-conducting device were to exceed the level set by reference voltage $V_{r2}$. Thus, only at some time interval $\tau$ after turn-off commencement, e.g. at time $T_1+\tau$, does the third comparator output 50c voltage rise from the previous low logic level to a high logic level, causing two simultaneous switching actions to occur: the first switching action is caused by the low logic level now present at the NOR gate output 44c, providing a low logic level A signal and removing device 28' from conduction, whereby divider resistance element 30 is no longer connected between multiplexer means output 10-2a and circuit common potential; the second action, responsive to the high logic level B signal at control input 32d, causes the third switch means 32, to couple the lower-magnitude first reference voltage $V_{r1}$ signal to the non-inverting input 26b of the second comparator. Thus, the second comparator reference voltage $V_{26b}$ continues at the $V_{r2}$ level during portion 66a and falls to the reference level $V_{r1}$ at the beginning of a second portion 66b, while the second comparator input 26a voltage substantially linearly rises, as shown in portion 68, substantially to the operating potential $+V$ level, e.g. about 15 volts, established by the zener voltage of diode 38c. The voltage $V_x$ remains substantially at the zener diode 38c voltage (actually at a voltage equal to the sum of the voltage of zener diode 38c and the conduction voltage of that one of conducting diodes 38, plus any additional voltage drop through second switch means 24), as shown in portion 64b, by action of resistances 12b, until the line-line half-cycle waveform decreases to a lesser voltage, during that portion 70 (FIG. 2b) when the source voltage is approaching the zero crossing preparatory to entering the negative-polarity source waveform half-cycle at time $t_O'$. Thus, immediately before the zero crossing at time $t_O'$, voltage $V_x$ is again substantially at the zero magnitude level; the voltage at the other second comparator input ($V_{26b}$) is again at the $V_{r1}$ level.

At the negative-going zero crossing, at time $t_O'$, the change in polarities at the first comparator inputs 20a and 20b cause first and second switch means 22 and 24 to operate, effectively connecting multiplexing means input 10-4a to circuit common potential (through switch means 22) and connecting the other sampling voltage input terminal 10-4b to the second switch means common terminal 24c, to again provide voltage $V_x$ as a positive-polarity signal, with respect to the other line terminal 12-2a and the circuit common potential terminals 10-1 and 12-1. The actions of second and third comparators 26 and 50, gates 40 and 44, and means 42 repeat the actions thereof during the positive-polarity half-cycle, whereby the initial conduction portion 72 (FIG. 2a) occurs normally until time $t_1'$, along with the $V_x$ portion 64' (FIG. 2b) and the $V_{26b}$ portion 66' (FIG. 2c). If the now-conducting switching device 12a-2a anode voltage does not exceed the second reference $V_{r2}$ level and normal turn-off action occurs at time $t_1'$, the otherwise abrupt conduction termination edge 72a' does not occur and the substantially linear turn-off edge 72a is instead provided, whereby conduction ceases at time $t_1'+\tau'$, at the end of the substantially-linearly-increasing portion 68' and after the portion 66a', of time duration $\tau'$. It should be understood that time intervals $\tau$ and $\tau'$ may, but need not, be equal, as each time interval duration is responsive to the selected maximum value of dV/dt and the switching device anode voltage present at the initiation of the controlled-turn-off action. The reference voltage $V_{r1}$ is thereafter provided to the non-inverting input of the second comparator, as shown by portion 66b', while the inverting input of the second comparator sees the substantially constant voltage portion 64b', which terminates when the source waveform half-cycle decreases in amplitude to provide the falling portion 70', preparatory to the next positive-going zero crossing at time $t_O''$. Thus, the entire source waveform cycle portion is completed, with multiplexing means 10 cooperating with control means 11: to detect the zero crossings, at times $t_O, t_O', t_O'' \ldots$ of the source 16 waveform; to monitor the anode voltage of that one of the power switching devices then in conduction, to provide a turn-off action if the conducting device is removed from saturation; to provide a controlled turn-off action, at either the normal "turn-off" time $t_1$ or at any time prior thereto, but after the associated zero crossing, wherein the decreasing voltage at the anode of the conducting one of device 12a-1a or 12a-2a is effectively limited to a previously set maximum dV/dt value; to provide charge to a power supply capacitance during a relatively large portion of the remainder of each source waveform half-cycle; and to automatically prepare the control and multiplexing means for detection of the next source waveform zero crossing and operation in the next half-cycle of the source waveform.

While one presently preferred embodiment of my novel multiplexing apparatus for utilization with integrated circuit control means for controlling at least one power switching device, in series with a load across an AC source, is described in detail herein, many variations and modifications will now become apparent to those skilled in the art. It is my intent, therefore, to be limited only by the scope of the appending claims and not by the specific details and instrumentalies presented by way of a presently preferred embodiment herein.

What I claim is:

1. Multiplexing apparatus for interconnecting a power switching module, having at least one switching device controlled into a saturated conductive condition responsive to a conduction control signal and connected to a load for controlling a flow of current therethrough from an AC source, with a control circuit means for providing said control signal to said switching module only if an auxiliary "on" control signal is provided, including:

first and second multiplexing apparatus terminals;

first and second substantially resistive elements, each connected between a different one of said first and second apparatus terminals and a different one of first and second opposed ends of the load-source series circuit;

first means, including: a first comparator having first and second inputs each connected to a different one of said first and second apparatus terminals, and an output providing a signal at one of first and second conditions responsive to one of said inputs being at a potential greater than the potential at the other input; and a pair of switch means, each having a common terminal controlled responsive to the first comparator output first and second conditions into connection between a different one of first and second selectable terminals; the first selectable terminal of a first one of said pair of switch means and the second selectable terminal of a second one of the pair of switch means being connected together in parallel to one of said first and second apparatus terminals, the second selectable terminal of said first switch means and the first selectable terminal of said second switch means being connected in parallel to the other of said apparatus terminals, the common terminal of one of said pair of switch means being connected to a circuit common potential, and the common terminal of the other of said pair of switch means multiplexing both half-cycles of the AC signal waveform, between said first and second apparatus terminals, as a first signal with a common preselected polarity;

means, responsive to the respective first and second conditions of a first logic signal, for providing a respective one of a first reference potential having the preselected polarity and a substantially zero magnitude and a second reference potential having the preselected polarity and a non-zero magnitude selected to be not greater than a saturation voltage of said switching module;

second means for providing a zero-crossing turn-on drive signal to said control circuit means at a first condition whenever said first signal is at a magnitude less than the substantially zero magnitude of the first reference potential, to cause said control circuit means to provide said control signal during each of the source signal waveform half-cycles responsive to the presence of both said zero-crossing signal and said auxiliary "on" signal; and third means, cooperating with at least said resistive elements and said first means, for monitoring the conduction condition of said at least one switching device to cause said control circuit means to remove said conduction control signal if said at least one switching device leaves the saturated conduction condition.

2. The apparatus of claim 1 wherein said second means comprises: a second comparator having a first input receiving said first signal, a second input receiving said reference potential, and an output at which said turn-on zero crossing drive signal is provided at said first condition whenever the magnitude of the signal at said first input is less than the magnitude of the reference potential at said second input.

3. The apparatus of claim 2, further comprising: power supply means connected to said apparatus first and second terminals for providing an operating potential to said apparatus.

4. The apparatus of claim 3, wherein said power supply means also provides operating potential for said control circuit means.

5. The apparatus of claim 3, wherein said power supply means comprises: means for rectifying the AC signal at each of said first and second terminals to provide a fluctuating DC potential; and means for filtering the fluctuating DC potential to provide a substantially-constant DC potential.

6. The apparatus of claim 5, wherein said rectifying means comprises a pair of unidirectionally-conducting semiconductor elements; and said filtering means comprises a filter capacitance.

7. The apparatus of claim 6, wherein the filter capacitance is physically located in said switching module.

8. The apparatus of claim 5, further comprising: means for regulating the magnitude of the operating potential.

9. The apparatus of claim 1, wherein said control circuit means provides said first logic signal at first and second conditions responsive to the control signal from said control circuit means being at levels respectively controlling said switching module to the conductivity and non-conductive conditions; and said third means further comprises: a second potential source having a magnitude substantial equal to the saturation voltage magnitude of said at least one switching element; and another switch means for connecting one of said first and second reference potentials as the reference potential to said second comparator second input, responsive to the presence of a respective one of said first and second conditions of said first logic signal; said second comparator output changing to a second condition, responsive to the saturation voltage magnitude exceeding said second reference potential, to cause said at least one switching device to be controlled to the non-conductive condition.

10. The apparatus of claim 9, wherein said another switch means comprises: a pair of controlled-conduction devices, each having a control input controlling current flow in a controlled circuit connected between a different one of said first and second reference potentials and said second comparator second input; and means for applying said first logic signal directly to the control input of the device connected to the first reference potential and with a logic inversion to the control input of the device connected to the second reference potential.

11. The apparatus of claim 1 further comprising; means for providing a gradual turn-off of conduction of the current flowing through said switching module, responsive to the first occurring one of the condition wherein said control circuit means no longer receives said auxiliary on signal and the condition wherein said at least one switching device leaves the saturated conduction condition.

12. The apparatus of claim 11, wherein said control circuit means generates a second logic signal responsive to the first occurring one of the condition wherein said control circuit means no longer receives said auxiliary "on" signal and the condition wherein said at least one switching device leaves the saturated conduction condition, and also turns off said switching module responsive to an increase in the magnitude of said first signal; said third means comprising: means operatively connected through said first means to one of said substantially resistive elements for attenuating the magnitude of said first signal provided to said control circuit means, responsive to the initiation of said second logic signal; and said gradual turn-off means operates in conjunction with the attenuated first signal for actively limiting the dV/dt change in said switching module to a predetermined maximum value.

13. The apparatus of claim 12, wherein said attenuating means comprises: a resistive element having a first end coupled to the output of said first means and a second end; and an additional switch means for connecting said resistive element second end to circuit common potential responsive to said second logic signal, to reduce, in conjunction with at least one of said substantially resistive elements, the magnitude of said first signal.

14. The apparatus of claim 12, further comprising: means for applying said first reference potential to said second comparator second input for the remainder of each source waveform half cycle after the cessation of the gradual turn-off of said switching module.

15. The apparatus of claim 11, further comprising: power supply means connected to said apparatus first and second terminals for providing an operating potential to said apparatus.

16. The apparatus of claim 15, wherein said power supply means also provides operating potential to said control circuit means.

17. The apparatus of claim 15, wherein said power supply means comprises: means for rectifying the AC signal at each of said first and second apparatus terminals to provide a fluctuating DC potential; and means for filtering the fluctuating DC potential to provide a substantially-constant DC potential.

18. The apparatus of claim 17, wherein said rectifying means comprises a pair of unidirectionally-conducting semiconductor elements; and said filtering means comprises a filter capacitance.

19. The apparatus of claim 18, wherein the filter capacitance is physically located in said switching module.

20. The apparatus of claim 17, further comprising: means for regulating the magnitude of the operating potential.

21. The apparatus of claim 1, wherein each of said first and second substantially resistive elements is of substantially the same resistance magnitude R.

* * * * *